(12) United States Patent
Vermeersch et al.

(10) Patent No.: US 9,697,211 B1
(45) Date of Patent: Jul. 4, 2017

(54) TECHNIQUES FOR CREATING AND USING A HIERARCHICAL DATA STRUCTURE

(75) Inventors: Dirk Vermeersch, San Jose, CA (US); Ashish Jain, New Delhi (IN)

(73) Assignee: Synopsys, Inc., Mountain View, CA (US)

( * ) Notice: Subject to any disclaimer, the term of this patent is extended or adjusted under 35 U.S.C. 154(b) by 1351 days.

(21) Appl. No.: 11/607,243

(22) Filed: Dec. 1, 2006

(51) Int. Cl.
*G06F 17/30* (2006.01)
*G06F 7/00* (2006.01)

(52) U.S. Cl.
CPC .. *G06F 17/30073* (2013.01); *G06F 17/30575* (2013.01)

(58) Field of Classification Search
CPC ......... G06F 17/30336; G06F 17/30073; G06F 17/30327; G06F 17/30575
USPC ...................................... 707/999.1, 204, 602
See application file for complete search history.

(56) References Cited

U.S. PATENT DOCUMENTS

| | | | | |
|---|---|---|---|---|
| 4,468,728 A | * | 8/1984 | Wang | |
| 4,763,244 A | * | 8/1988 | Moyer | G06F 12/1027 711/206 |
| 5,201,047 A | * | 4/1993 | Maki et al. | |
| 5,257,365 A | * | 10/1993 | Powers et al. | |
| 5,265,244 A | * | 11/1993 | Ghosh et al. | |
| 5,617,554 A | * | 4/1997 | Alpert | G06F 12/1009 711/208 |
| 5,675,784 A | * | 10/1997 | Maxwell | G06Q 10/10 |
| 5,794,229 A | * | 8/1998 | French | G06Q 40/00 |
| 5,806,065 A | * | 9/1998 | Lomet | G06F 17/30327 707/610 |
| 6,301,579 B1 | * | 10/2001 | Becker | |
| 6,999,966 B2 | * | 2/2006 | Liang et al. | |
| 7,631,188 B2 | * | 12/2009 | Valente | 713/175 |
| 7,885,200 B2 | * | 2/2011 | Elsner et al. | 370/252 |
| 2002/0010700 A1 | * | 1/2002 | Wotring et al. | 707/100 |
| 2002/0107860 A1 | * | 8/2002 | Gobeille et al. | 707/101 |
| 2002/0129017 A1 | * | 9/2002 | Kil et al. | 707/6 |
| 2004/0015486 A1 | * | 1/2004 | Liang et al. | 707/3 |
| 2004/0024729 A1 | * | 2/2004 | Worley | G06F 12/1027 |
| 2004/0250043 A1 | * | 12/2004 | Ripberger et al. | 711/206 |
| 2005/0192983 A1 | * | 9/2005 | Hattori et al. | 707/100 |
| 2006/0085440 A1 | * | 4/2006 | Jandhyala et al. | 707/100 |
| 2006/0143238 A1 | * | 6/2006 | Tamatsu | G06F 17/30336 |
| 2006/0168271 A1 | * | 7/2006 | Pabari | H04L 41/142 709/230 |
| 2006/0268913 A1 | * | 11/2006 | Singh | H04L 49/90 370/412 |

* cited by examiner

*Primary Examiner* — Kuen Lu
(74) *Attorney, Agent, or Firm* — Fenwick & West LLP

(57) ABSTRACT

Techniques for creating and using a hierarchical data structure, in accordance with embodiments of the present invention include storing received data as records in a first level of the hierarchical data structure. One or more parameters for each block of records in the first level are summarized and stored in a second level of the hierarchical data structure. The techniques may also include querying a given level of a hierarchical data structure. One or more blocks of records one level below the given level are accessed. Each of the accessed blocks correspond to records that are summarized by records in the given level that satisfies the query.

16 Claims, 6 Drawing Sheets

115

| Pointer | T-min | T-max | V-min | V-max |
|---------|-------|-------|-------|-------|
|         |       |       |       |       |
|         |       |       |       |       |
|         |       | ⋮     |       |       |
|         |       |       |       |       |

Nth Level

Figure 1C

TECHNIQUES FOR CREATING AND USING A HIERARCHICAL DATA STRUCTURE

BACKGROUND OF THE INVENTION

Computing devices have made significant contributions toward the advancement of modern society and are utilized in a number of applications to achieve advantageous results. Numerous devices, such as personal computers, laptop computers, servers, minicomputer, mainframe computer, workstation, distributed computer systems, simulators, emulators, debuggers, computer aided design (CAD) systems, and automatic test equipment (ATE) have facilitated increased productivity and reduced costs in analyzing and communicating data in most areas of business, science, engineering, education and entertainment. For instance, computing devices, such as simulators, emulators, debuggers, CAD systems, and/or ATE systems are utilized to design, simulate, emulate, analyze and/or test components, devices, circuits, systems, and the like.

The design, simulation, emulation, analysis and/or testing of components, devices, circuits, systems and/or the like may generate a very large amount of data. Some simulators, emulators, debuggers, CAD systems, ATE systems and the like may generate kilobytes, megabytes, gigabytes or more of data. As the components, devices, circuits, and systems and/or the instruments used to design, simulate, emulate, analyze and test them become ever increasingly complex, the amount of data generated continues to increase. Therefore, there is a continuing need for improved techniques for storing and accessing such data.

SUMMARY OF THE INVENTION

Embodiments of the present invention are drawn to techniques for creating and using a hierarchical data structure. In one embodiment, a method of creating a hierarchical data structure includes storing received data as records in a first level of the hierarchical data structure. Parameters for each block of records in the first level are summarized and stored in a second level of the hierarchical data structure.

In another embodiment, a method of utilizing a hierarchical data structure includes querying a given level of the data structure. One or more blocks of records one level below the given level are accessed. Each of the one or more blocks accessed are those that are summarized by a record in the given level that satisfies the query.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIGS. 1A, 1B and 1C show a block diagram of a hierarchical data structure, in accordance with one embodiment of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1A:
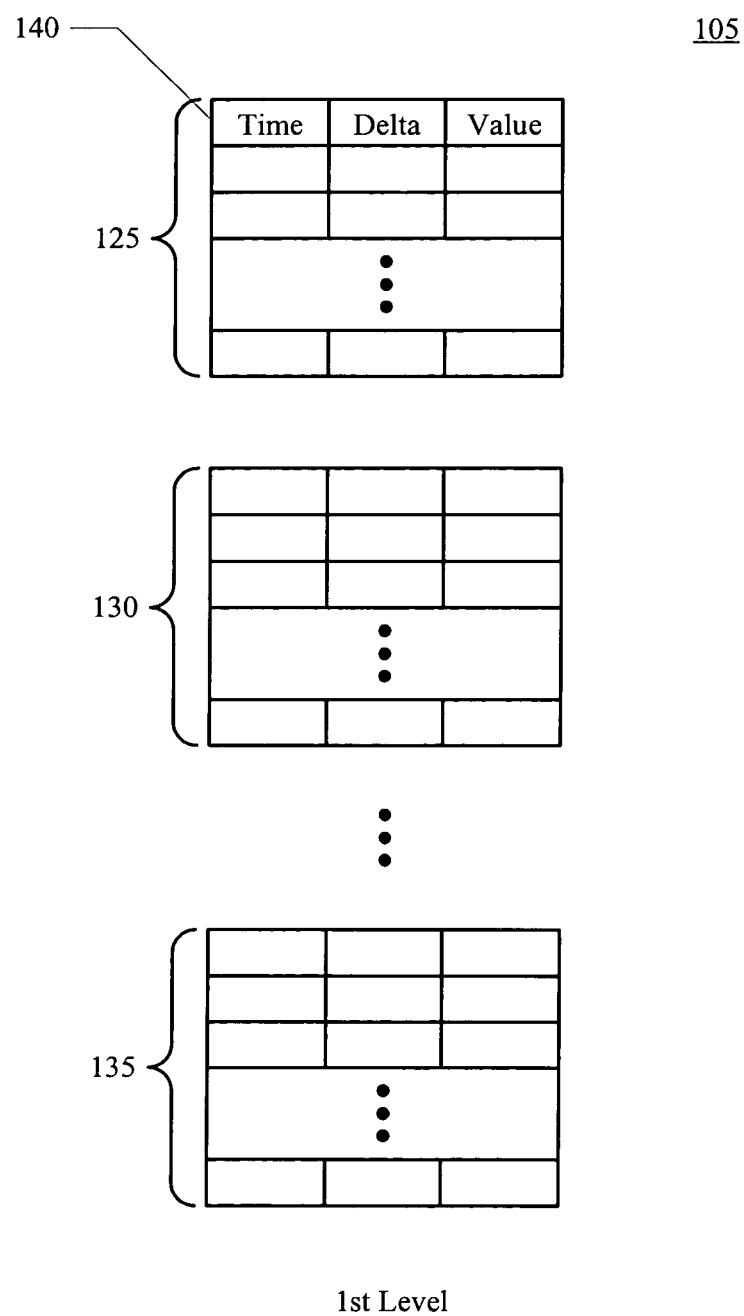
Figure 1B:
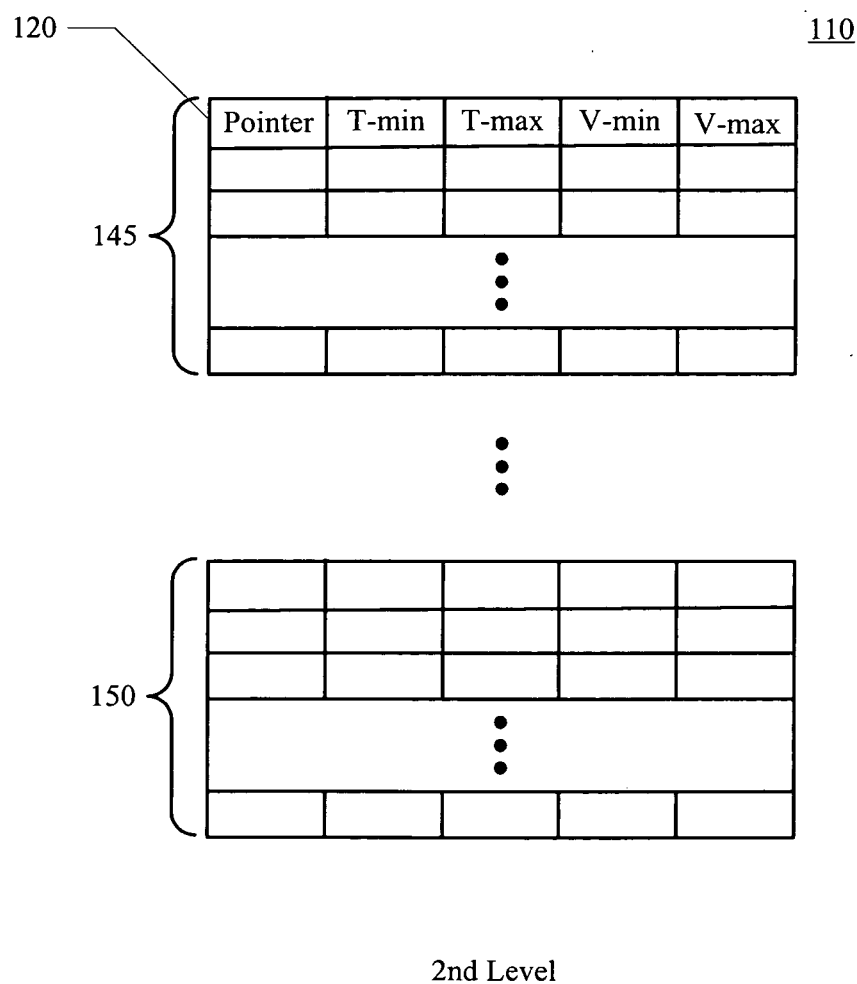

Referring to FIGS. 1A, 1B and 1C, a block diagram of a hierarchical data structure, in accordance with one embodiment of the present invention, is shown. The hierarchical data structure may be embodied in one or more computing device readable media coupled to one or more computing devices. The hierarchical data structure includes a first level 105 for storing root data. The root data may be stored as a plurality of records wherein each record 140 stores a set of sample values.

The hierarchical data structure also includes one or more additional levels (e.g., level 2 through level N) 110, 115 that summarizes data contained in the previous level. The additional levels 110, 115 include a record 120 for each block of records 125, 130, 135 in the previous level. The records in the additional levels 110, 115 may include statistical information such as minimum, maximum, average, mean, variance, standard deviation, moment, quartile, range, distribution and/or the like.

For example, each record 140 in the first level 105 may include a plurality of parameters that may relate to an event, transaction or the like. In one implementation the parameters may be transaction, trace, state sample, or the like data, generated by simulators, emulators, debuggers, computer aided design (CAD) systems, automatic test equipment (ATE), or the like. In one implementation, the first level 105 of the hierarchical data structure may include information stored in a plurality of tables 125, 130, 135. In one implementation, the size of the tables 125, 130, 135 in the first level 105 may correspond to the page size of a computing device utilizing the data structure.

The second level 110 of the hierarchical data structure may include a plurality of records, wherein each record 120 corresponds to a block of records 125 in the first level 105. In one implementation, each record 120 in the second level 110 may include summaries of one or more parameters in a given table 125 in the first level 105. Each summary in the second level 110 may for instance include a start value, an end value, a minimum value and a maximum value from all the records in a given table 125 in the first level 105. Each record in the second level 110 may also include a pointer to the given table 125 in the first level 105. In one implementation, the summary information in the second level 110 may be stored in a plurality of tables 145, 150. In one implementation, the size of the tables in the second level 110 may also correspond to the page size of the computing device utilizing the data structure.

The hierarchical data structure may also include a third level. In one implementation, each record in the third level may include summaries of one or more parameters in the second level. The summaries in the third level may for instance include a start value, an end value, a minimum value and a maximum value for all the records in a given table in the second level. In one implementation, the summary information in the third level may also be stored in a plurality of tables. In one implementation, the table size may correspond to the page size of the computing device utilizing the data structure. The hierarchical data structure may also include a fourth level, a fifth level, and so on 115, that similar summarize the level before them. The number (e.g., N) of levels in the hierarchical data structure may, in one implementation, be dependent upon a specified level of detail for the summaries stored in the additional levels 110, 115.

Figure 2:
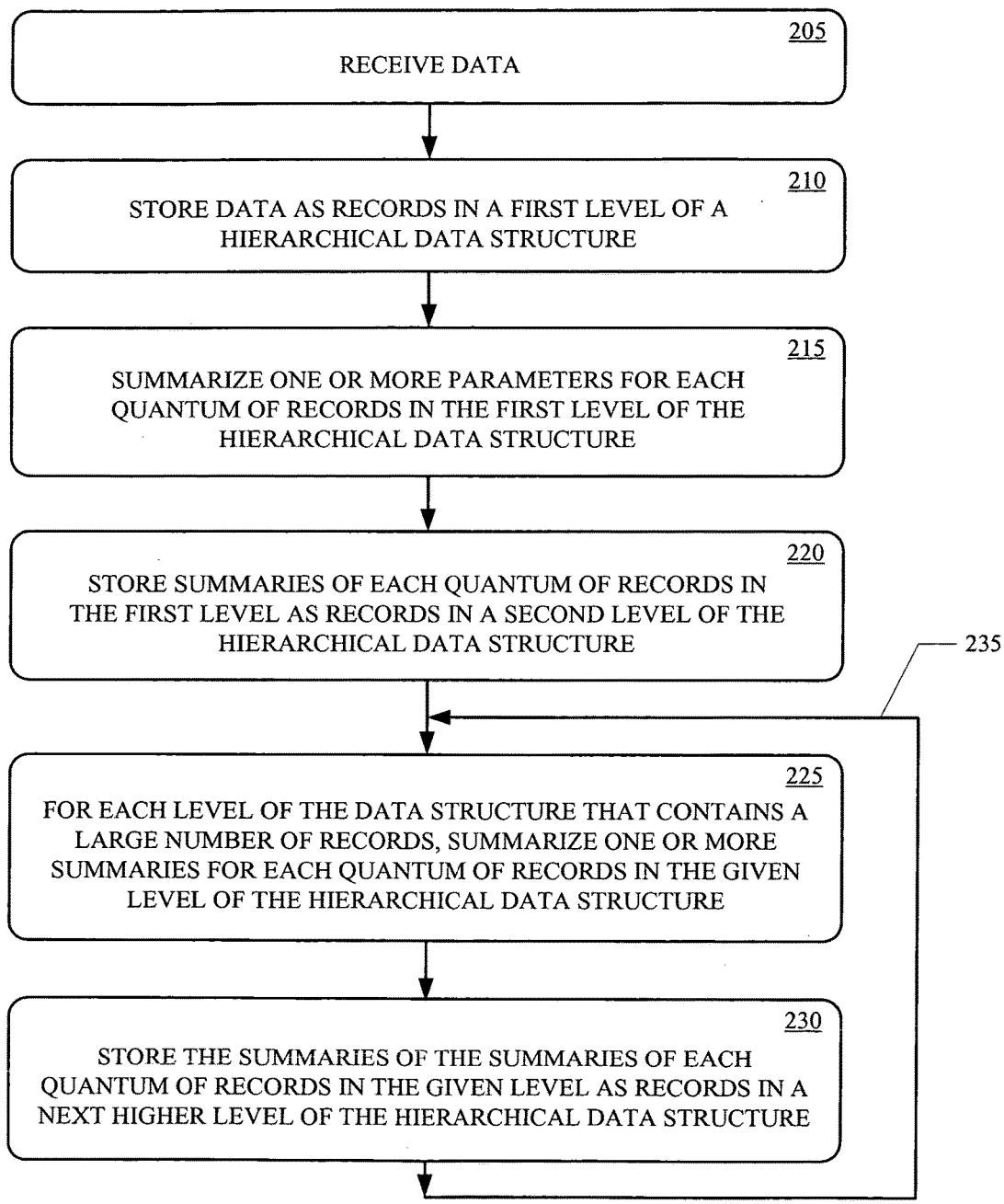
FIG. 2 shows a flow diagram of a method of creating a hierarchical data structure, in accordance with one embodiment of the present invention.

The hierarchical data structure is further described herein with regard to the method shown in FIG. 2, which shows a method of creating the data structure in accordance with one embodiment of the present invention. The hierarchical data structure created by the method may be embodied in one or more computing device readable media coupled to one or more computing devices. In addition, the method of creating the hierarchical data structure may be embodied in one or more computing device readable media coupled to one or more computing devices.

The method begins with receiving data, at 205. The data may include the value of one or more parameters (e.g., time, voltage, current, frequency, logic state) for an event, translation, trace, state sample or the like. Each set of parameter values are stored as a record 140 in a first level 105 of the hierarchical data structure, at 210. In one implementation, the records are stored sequentially in tables 125, 130, 135 of the first level 105 of the data structure.

For example, upon receipt of a first set of parameter values, a first table 125 containing the first set of parameter values as a first record is created 140. Each subsequent set of parameter values that are received are appended to the table 125 until the first table 125 is filled. When first table 125 is filled, a second table 130 is created and the next set of parameter values that are received are stored as the first record in the second table 130. Thereafter subsequent sets of parameter values are appended to the second table 130. The process continues to create a new table to store the next set of parameter values that are received after the current table is filled. For each new table created, the subsequently received sets of parameter values are appended to the new table until the table is filled. In one implementation, the size of each table 125, 130, 135 in the first level 105 is limited to the page size of the computing device readable media utilized by a computing device to store the hierarchical data structure. Setting the size of the table to correspond to the page size of the computing device readable media enables efficient storage of the first level of the data structure in the primary memory (e.g., system memory, RAM) and secondary memory (e.g., bulk storage, hard disk drive) of a computing device and transfers there between.

After a given quantum of records are stored in the first level 105 of the hierarchical data structure, the values of one or more parameters in the given quantum of records are summarized, at 215. In one implementation, the quantum of records is equal to the size of the tables 125, 130, 135 in the first level 105 of the data structure. Thus, after each table is filled in the first level 105, one or more parameters in the given table 125 are summarized.

The summaries (e.g., T-min, T-max, V-min, V-max) are stored as a summary record in a second level 130 of the hierarchical data structure, at 220. The summaries may include minimum, maximum, average, mean, variance, standard deviation, moment, quartile, range, distribution and/or the like statistical information about one or more parameters in the given quantum of root records. In one implementation, the summary records in the second level 110 also include a pointer to the table in the first level 105 that the record summarizes. In one implementation, the summary records are stored sequentially as records in one or more tables 145, 150 in the second level 110 of the data structure.

After a given quantum of records are stored in the second level 110 of the hierarchical data structure, the values of one or more parameters in the given quantum of records in the second level are summarized, at 225. The quantum for the second level may be less than, equal to or greater than the quantum of records for the first level. In one implementation, the quantum of records is equal to the size of the tables 145, 150 in the second level 110 of the data structure. Thus, after each table is filled in the second level 110, summaries in the given table 145 are further summarized.

In one implementation, the summaries can be further summarized in accordance with the following functions:

$$\max(\{s1\},\{s2\})=\max \text{ of } \{\max(\{s1\}),\max(\{s2\})\}$$

$$\min(\{s1\},\{s2\})=\min \text{ of } \{\min(\{s1\}),\min(\{s2\})\}$$

$$\text{sum}(\{s1\},\{s2\})=\text{sum}(\{s1\})+\text{sum}(\{s2\})$$

$$\text{count}(\{s1\},\{s2\})=\text{count}(\{s1\})+\text{count}(\{s2\})$$

Summaries can also be created any time, during writing as well as demand based during post processing. Subsequent summaries may be calculated without modifying previous summaries. The summaries may also be used for faster calculation of other statistical information.

The summaries of the summaries (e.g., T-min, T-max, V-max) are stored as a summary record in a third level of the hierarchical data structure, at 230. In one implementation, the summary records in the third level also include a pointer to the table in the second level 110 that the record further summarizes. In one implementation, the summary records are stored sequentially as records in one or more tables in the third level of the data structure.

The process of summarizing the records in a given level and storing the summaries in a next high level of the hierarchical data structure may be repeated as desired, at 235. Thus, for each level that contains a large number of records, a summary of each given quantum of records in the given level may be generated and stored as a record in a next higher level. In one implementation, a large number of records is an amount that consumes more than a plurality of pages of computing device readable media.

Figure 3:
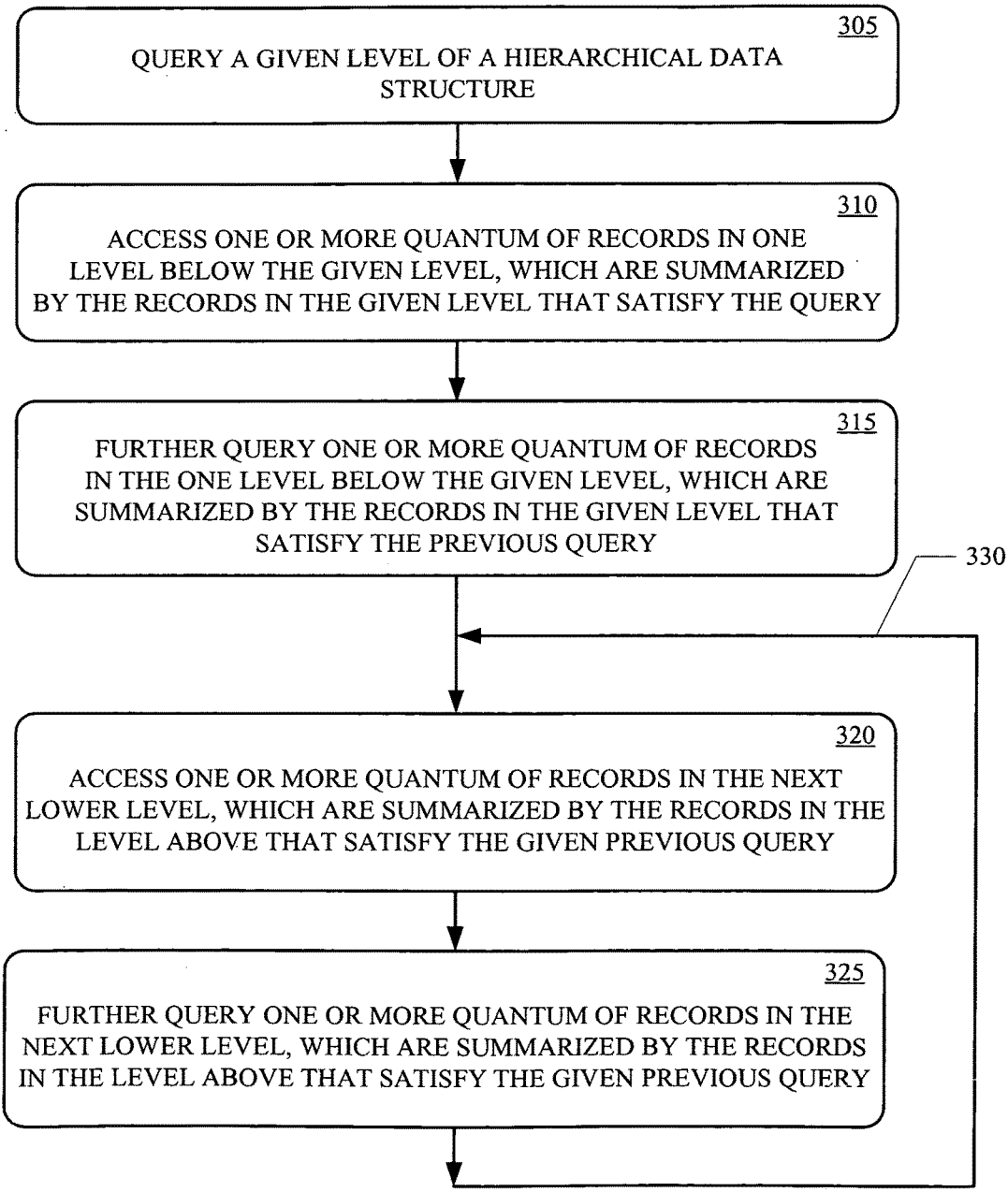
FIG. 3 shows a flow diagram of a method of utilizing a hierarchical data structure, in accordance with one embodiment of the present invention.

Referring now to FIG. 3, a method of using the hierarchical data structure for retrieval of data, in accordance with one embodiment of the present invention, is shown. In one implementation, transaction, trace, state sample data, or the like, generated by simulators, emulators, debuggers, CAD systems, ATE systems or the like may be retrieved from the hierarchical data structure. The data in the hierarchical data structure accessed by the method may be embodied in one or more computing device readable media coupled to one or more computing devices. In addition the method of accessing the data may also be embodied in one or more computing device readable media coupled to one or more computing devices.

The method begins with querying a given level of a hierarchical data structure, at 305. The query is a request for information based on specific criteria. The criteria may, for example, be a specific value, a state, a range of values, a transaction object, or the like. The given level may be the highest level or any of a plurality of intermediate levels in the hierarchical data structure. At 310, one or more quantum of records in one level below the given level may be accessed. The accessed records are those records that are summarized by records in the given level that satisfy the query. In one implementation, each quantum of records may be stored in a corresponding table in the level below the given level. In one implementation, the size of the tables corresponds to the page size of the computing device utilizing the hierarchical data structure.

In one implementation, accessing the one or more quantum of records in the level below the given level may include reading the one or more corresponding pages that store the one or more corresponding tables from a mass storage system (e.g., hard disk) and caching them in system memory (e.g., RAM). In one implementation, accessing the one or more quantum or records in the level below the given level may include outputting the values of one or more parameters contained therein. In one implementation, the values of the one or more parameters are output by rendering a visual representation (e.g., trace) on a display to a user. In another implementation, the values of the one or more parameters are output by storing the values in another data structure.

The method may proceed with further querying the one or more quantum of records in the level below the given level, at 315. The records that are further queried are those records that are summarized by records in the given level that satisfy the previous query.

The method may further proceed with accessing one or more quantum of records in the next lower level, at 320. The accessed records are those records that are summarized by records in the level above that satisfy the given previous query.

The method may also further proceed with further querying the one or more quantum of records in the next lower level, at 325. The records that are further queried are those records that are summarized by records in the level above that satisfy the given previous query.

In one implementation, the processes at 320 and 325 may also be iteratively repeated, at 330. In one implementation, the processes are 320 and 325 are iteratively repeated until a desired level of detail provided by the summaries is reached. In another implementation, the processes at 320 and 325 are iteratively repeated until the root data (e.g., lowest level) is reached.

In an exemplary implementation, simulator data stored in a hierarchical data structure may be rendered by first querying the highest level of the data structure. The one or more records in the highest level of the data structure, that satisfy the criteria of the query, each summarize a given table of records in the second highest level of the data structure. Thus, one or more records in each of the given tables of records in the second highest level also satisfy the criteria. However, the other tables in the second highest level do not satisfy the criteria and therefore can be skipped in a further query.

The given tables in the second high level of the data structure that are summarized by records in the highest level, that satisfy the query, may be further queried. The further query identifies the one or more records in the second highest level of the data structure that satisfy the criteria. If the records in the given tables in the second highest level, that satisfy the further query, provide a desired level of detail, the summarized parameters in the given tables in the second highest that satisfy the further query can be utilized to render the simulation data. However, if the records in the given tables in the second highest level do not provide the desired level of detail, the given tables in the third highest level of the data structure may be still further queried. The records that are further queried are those that are summarized by records in the given tables in the second highest level that satisfy the previous query, The process may be repeated until the levels of the hierarchical data structure have been walked to reach the desired level of detail or until the root records that satisfy the criteria have been determined.

Keeping summaries over non-unique keys allow fast search/iteration of records as well. For example, keeping a min/max summary over the value of a signal trace allows for the record of a certain value to be found without scanning any records for which the summary indicates is outside the range.

The summaries may be utilized to search for specific records, to render at a given level of detail, and the like. For example, during querying of event records, range queries over time are often of interest. Such queries typically involve transaction identifiers, which may be time invariant keys for temporal objects that are often generated by incrementing a counter. The transaction identifiers may be range queried to reconstruct all information belonging to a transaction object. Such fields generally are characterized by a large number of range values, which may not be strictly ordered but are largely ordered in all transaction related tables. Thus, utilizing the range summaries of the table based data structure is effective and useful. It may serve for conditional traversals involving these fields with increased selectivity, which enables many irrelevant pages to be skipped. The summaries may also serve as indexes for these fields, even if they are secondary, to enable joins.

For event records, such as analog waveforms, that may hold integer or double data values, the event records can be rendered based on the summaries at a given level of the hierarchical data structure. For instance, if the time range of a summary maps to a single horizontal pixel of a display screen, all the data values for that time range can be rendered by drawing a line from the last x, y coordinate of the waveform to the start summary value, drawing a line to the minimum summary value, drawing a line to the maximum summary value and then drawing a line to the last summary value. The end result on the screen would be the same as if lines were rendered to all recorded samples in the range. Similarly for other waveforms, when there are too many records to map to the screen, the waveform can be rendered using the summary.

Figure 4:
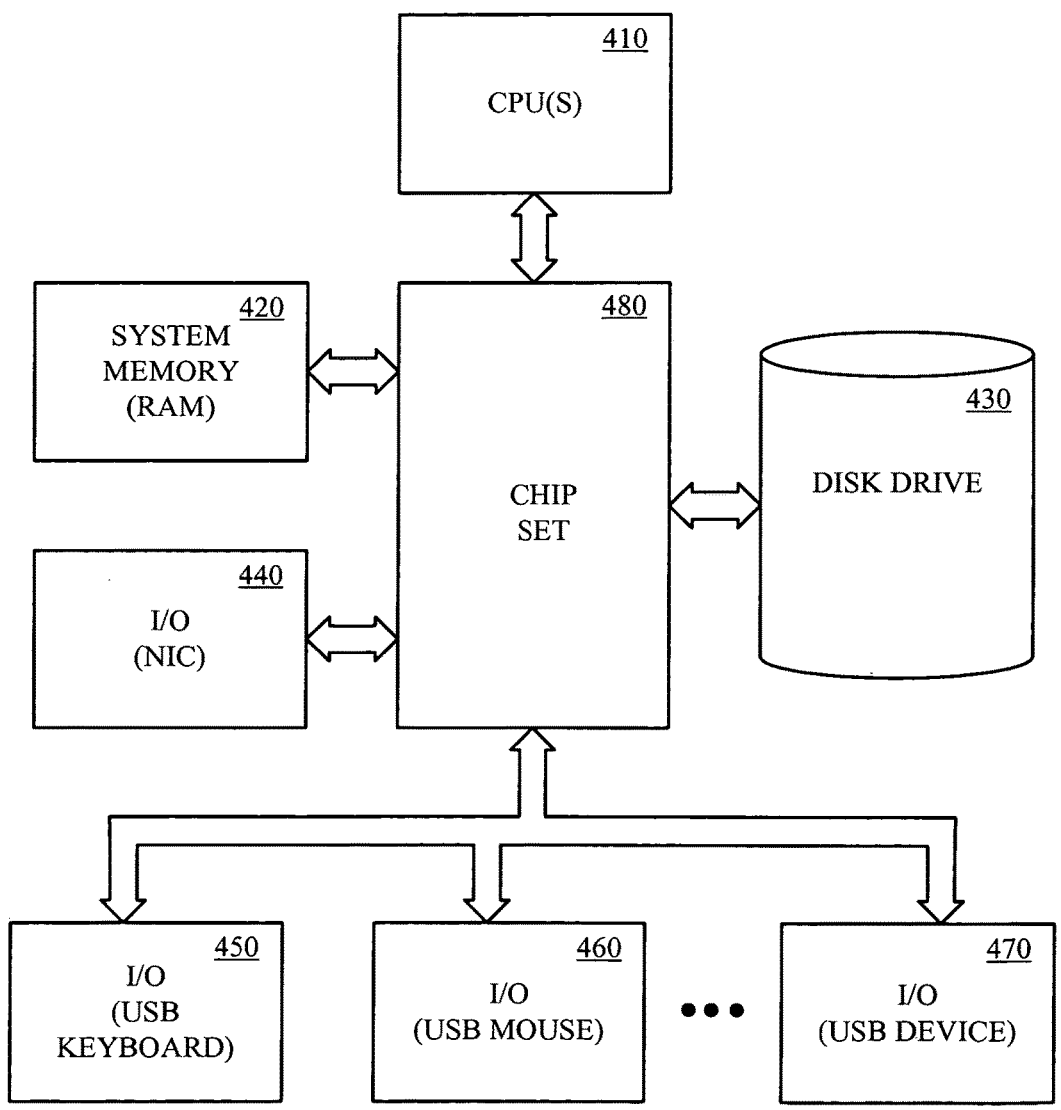
FIG. 4 shows a block diagram of an exemplary computing device for implementing embodiments of the present invention.

Referring now to FIG. 4, an exemplary computing device for implementing embodiments of the present invention is shown. The computing device 400 may be a local or remote device, such as an emulator, simulator, debugger, CAD system, ATE system, personal computer, server computer, client computer, laptop computer, hand-held device, minicomputer, mainframe computer, distributed computer system or the like. The computing device 400 includes one or more processors (e.g., CPU) 410, one or more computing device readable media 420, 430 and one or more input/output (I/O) devices 440, 450, 460, 470. The computing device readable media 420, 430, and I/O devices 440, 450, 460, 470 may be communicatively coupled to the processor 410 by a chip set 480 and one or more busses. The chipset 480 acts as a simple input/output hub for communicating data and instructions between the processor 410 and the computing device-readable media 420, 430, and I/O devices 440, 450, 460, 470.

The I/O devices 440, 450, 460, 470 may include one or more network interface cards 440, and peripherals such as a keyboard, a pointing device, a monitor, a speaker, a printer, and/or the like. The network interface card 440 provides for access to one or more other computing devices, networks and/or storage devices remote to the computing device 400.

Generally, local storage, such as a magnetic disk and/or optical disk, provides for non-volatile storage of computing device readable instructions and data for use by the computing device 400. For instance, the disk drive 430 may store an operating system (OS), applications and data. The data may be stored in a hierarchical data structure in accordance with embodiments of the present invention. The system memory (e.g., RAM) 420 provides for volatile storage of computing device readable instructions and data for use by the computing device 400. For instance, the system memory 420 may temporarily store executing portions of the operating systems, one or more applications and associated data that are currently used by the CPU 410. In particular, the system memory 410 may cache one or more pages of the hierarchical data structure currently utilized by the CPU 410. One or more cached pages may include one or more tables of root records and/or one or more tables of summary records at one or more levels of the hierarchical data structure. In one implementation, the tables are equal to the page size utilized by the computing device for caching of data from the disk drive 430 in the system memory 420.

In accordance with the above description, embodiments of the present invention advantageously include a hierarchical data structure for recording and/or retrieving data. Appending new data as records in the first level of the data structure and appending additional summaries in the corresponding level of the data structure advantageously enables fast recording. The use of page sized tables in the root level and one or more summary levels enables increased performance when page caching techniques are utilized. Use of caching also controls memory usage for clients. Furthermore, the summary records in one or more levels advantageously enable retrieval of records containing specific values of parameters without retrieving all the records in the data structure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
receiving data;
storing the data as records in a first level of a hierarchical data structure of a computing device readable media having a page size, the records in the first level organized into a plurality of ordered and separate tables in the first level by sequentially appending the records to a preceding table in the first level until the preceding table attains a size that corresponds to the page size before appending the records to a subsequent table in the first level;
summarizing one or more parameters for each table of records in the first level of the hierarchical data structure into summaries that include statistical information, each summary generated to correspond to a different table of the plurality of tables in the first level;
storing the summaries as records in a second level of the hierarchical data structure;
summarizing the summaries in the second level of the hierarchical data structure to generate summaries of the summaries; and
storing the summaries of the summaries as records in a third level of the hierarchical data structure.

2. The method according to claim 1, wherein each record in the first level stores a set of sample values.

3. The method according to claim 1, wherein each record in the first level comprises a plurality of parameters.

4. The method according to claim 1, wherein each record in the second level comprises a summary of one or more parameters in a corresponding table of records in the first level.

5. The method according to claim 1, wherein the records in the second level are organized into a plurality of separate tables in the second level.

6. The method according to claim 5, wherein a maximum size of each table in the second level corresponds to the page size of the computing device readable media storing the hierarchical data structure.

7. The method according to claim 1,
wherein the records in the third level are organized into a plurality of separate tables in the third level.

8. The method of claim 1 further comprising:
querying a given level of tables of the hierarchical data structure, wherein each record in the given level of tables summarizes and points to a corresponding table of records stored in one level of tables below the given level of tables of the hierarchical data structure; and
accessing one or more tables of records in the one level of tables below the given level of tables pointed to by one or more records in the given level of tables which summaries satisfy the query.

9. The method according to claim 8, wherein accessing one or more tables of records in the one level of tables below the given level of tables comprises rendering one or more parameters in the one or more tables of records in the one level of tables below the given level of tables.

10. The method according to claim 8, further comprising further querying one or more tables of records in the one level of tables below the given level of tables, wherein each of the one or more tables of records is summarized by a record in the given level of tables that satisfies the previous query.

11. The method according to claim 10, further comprising accessing one or more tables of records in a next lower level of tables, wherein each of the one or more tables of records is summarized by a record in the level of tables above that satisfies the given previous query.

12. The method according to claim 11, wherein:
the given level of tables is the third level of tables of the hierarchical data structure;
the one level of tables below the given level of tables is the second level of tables of the hierarchical data structure; and
the next level of tables is the first level of tables of the hierarchical data structure that stores the data.

13. A non-transitory computing device readable media including instructions which when executed cause a processor to implement a method comprising:
   receiving data;
   storing the data as records in a first level of a hierarchical data structure stored in the computing device readable media, the records organized into a plurality of ordered and separate tables in the first level by sequentially appending the records to a preceding table in the first level until the preceding table attains a size that corresponds to a page size of the computing device readable media before appending the records to a subsequent table in the first level;
   summarizing one or more parameters for each table of records in the first level of the hierarchical data structure into summaries that include statistical information, each summary generated to correspond to a different table of the plurality of tables in the first level;
   storing the summaries as records in a second level of the hierarchical data structure;
   summarizing the summaries in the second level of the hierarchical data structure to generate summaries of the summaries; and
   storing the summaries of the summaries as records in a third level of the hierarchical data structure.

14. The computing device-readable media according to claim 13, further comprising:
   querying the second level of the hierarchical data structure; and
   rendering one or more parameters in one or more tables of records in the first level, wherein each of the one or more tables of records are summarized by a record in the second level that satisfies the query.

15. The computing device-readable media according to claim 13, further comprising:
   querying the third level of the hierarchical data structure;
   further querying one or more tables of records in the second level, wherein each of the one or more tables of records in the second level are summarized by a record in the third level that satisfies the query; and
   rendering one or more parameters in one or more tables of records in the first level, wherein each of the one or more tables of records in the first level are summarized by a record in the second level that satisfies the further query.

16. The computing device-readable media according to claim 13, further comprising:
   querying the third level of the hierarchical data structure; and
   rendering one or more parameters in one or more tables of records in the second level, wherein each of the one or more tables of records in the second level are summarized by a record in the third level that satisfies the query.

\* \* \* \* \*